P. P. STOKER
RAILWAY TRAFFIC CONTROLLING APPARATUS
Nov. 24, 1931. Original Filed Dec. 8, 1927 Re. 18,264
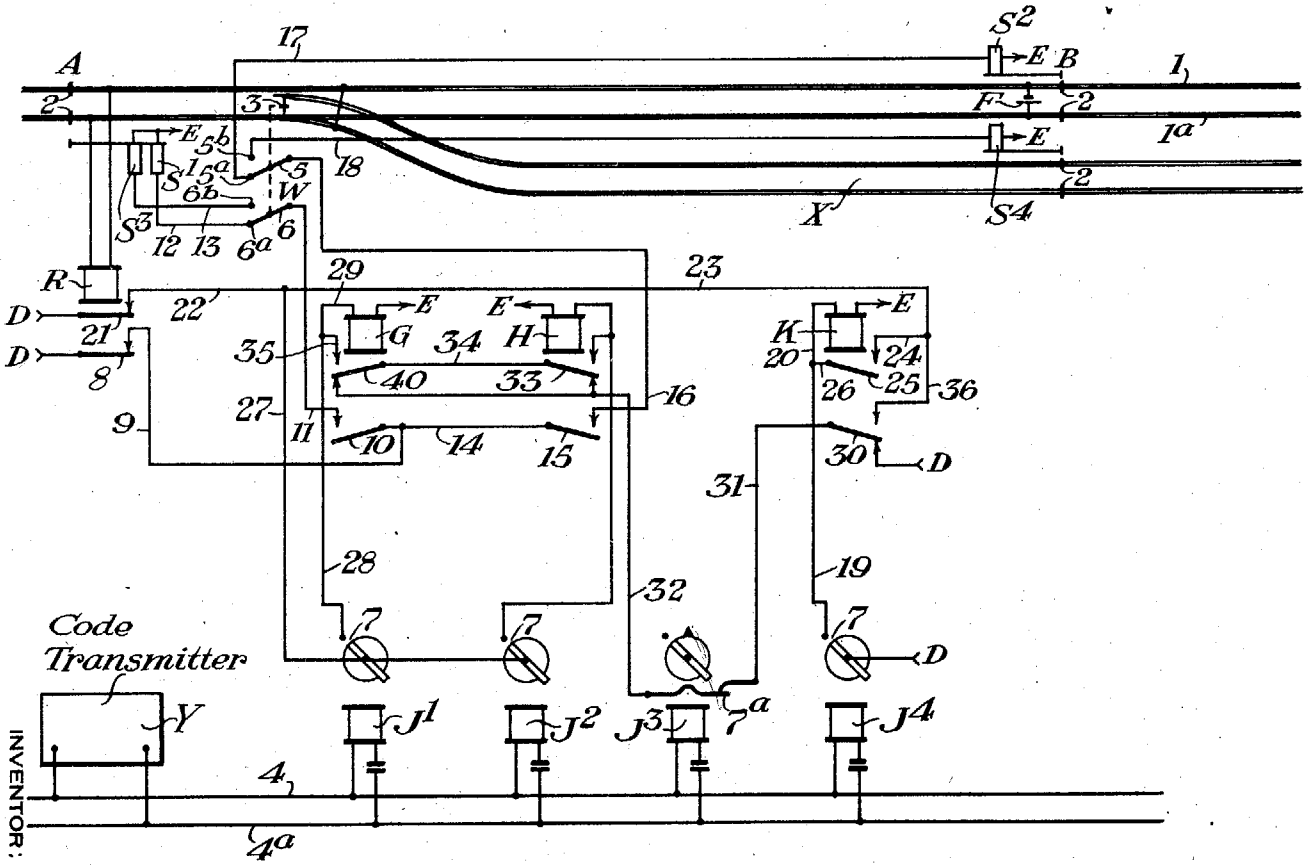
INVENTOR:
P. P. Stoker,
by A. L. Vansill
His attorney Reissued Nov. 24, 1931

Re. 18,264

UNITED STATES PATENT OFFICE

PAUL P. STOKER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Original No. 1,750,247, dated March 11, 1930, Serial No. 238,558, filed Decemoer 8, 1927. Renewed August 2, 1929. Application for reissue filed August 26, 1931. Serial No. 559,566

My invention relates to railway traffic controlling apparatus, and particularly to apparatus of the type intended for safely controlling railway traffic governing devices, such as railway signals, from a remote point.

I will describe one form of railway traffic controlling apparatus embodying my invention, and will then point out the novel features thereof in claims.

The accompanying drawing is a diagrammatic view showing one form of railway traffic controlling apparatus embodying my invention.

Referring to this drawing, the reference characters 1 and $1^a$ designate the track rails of a stretch of railway track connected with a siding X, by a switch 3 of the usual and well known form. The switch 3 may be operated in any suitable manner. Since the apparatus for controlling the switch forms no part of my present invention, it has been omitted from the drawing for the sake of simplicity. The rails adjacent the switch are divided, by means of insulated joints 2, to form a track section A—B and track circuit current is supplied to the rails adjacent point B from a suitable source of energy such as a battery F. A track relay R is connected across the rails of the section A—B adjacent A and the relay R is therefore normally energized but is deenergized when a train occupies any portion of the section A—B. The rails of the siding X are connected with the rails of section A—B in the usual manner so that a train occupying the siding adjacent the switch will deenergize the track relay R.

Associated with the switch 3 is a circuit controller W comprising two contacts 5—$5^a$ and 6—$6^a$ which are closed only when the switch occupies the normal position in which it is illustrated in the drawing. Contacts 5—$5^b$ and 6—$6^b$ are closed only when the switch occupies its reverse position.

Westbound traffic, that is, traffic moving from right to left over the stretch of track shown in the drawing, is controlled by two signals $S^2$ and $S^4$. Traffic in the opposite direction is controlled by two similar signals $S^1$ and $S^3$ which in the form here shown are mounted on the same mast. The signals S are illustrated in the drawing as semaphore signals but this particular form is not essential.

The signals are controlled by two relays G and H and by the circuit controller W so that if relay G is energized when the switch is normal, current flows from terminal D of a suitable source of energy not shown in the drawing over front contact 8 of relay R, wire 9, front contact 10 of relay G, wire 11, contact 6—$6^a$ of circuit controller W, wire 12, and operating mechanism of signal $S^1$, to terminal E of the same source. If the switch 3 is reversed when relay G is energized, current flows over the circuit just traced to wire 11 and thence over contact 6—$6^b$ of circuit controller W, wire 13, and operating mechanism of signal $S^3$ to terminal E. When relay H is energized, current flows from terminal D, over front contact 8 of relay R, wires 9 and 14, front contact 15 of relay H to wire 16, and thence, if switch 3 occupies its normal position, over contact 5—$5^a$ of circuit controller W, wire 17, and operating mechanism of signal $S^2$ to terminal E. If switch 3 is reversed, current flows over the circuit just traced as far as wire 16, and thence over contact 5—$5^b$ of circuit controller W, wire 18, and operating mechanism of signal $S^4$ to terminal E. It follows, therefore that if relay G is energized, signal $S^1$ or $S^3$ is cleared, according as switch 3 occupies its normal or reverse position, but that when relay H is energized, signal $S^2$ or signal $S^4$ is cleared according as the switch occupies its normal or reverse position.

Relays G and H are controlled in part by a series of selectors $J^1$, $J^2$, $J^3$ and $J^4$ which are connected in parallel across a pair of line wires 4 and $4^a$. The selectors J are selectively responsive to control codes which may be impressed upon the line wires 4 and $4^a$ by any suitable means. It is frequently desirable to control the selectors J by means of a code transmitter indicated diagrammatically at Y and located at some central control point, such for example, as a train despatcher's office. Each of the selectors $J^1$, $J^2$ and $J^4$ comprises a normally open contact 7 which is arranged to be closed for a brief interval of time when the corresponding selector receives its proper control code. The selector $J^3$ comprises a normally closed contact $7^a$ which is arranged to be opened for a brief interval of time when selector $J^3$ receives its proper control code.

The selector $J^4$ controls a relay K in such manner that the relay becomes energized when selector $J^4$ is operated. The pick-up circuit for relay K may be traced from terminal D over contact 7 of selector $J^4$, wires 19 and 20, and winding of relay K to terminal E. After relay K has once been energized, the relay is held closed as long as relay R remains energized, by virtue of a stick circuit which passes from terminal D, over front contact 21 of relay R, wires 22, 23 and 24, front contact 25 of relay K, wires 23 and 20, and winding of relay K to terminal E. It follows therefore, that relay K is normally deenergized but that this relay may be closed by operating selector $J^4$, whereupon the relay K remains closed until a train enters section A—B to deenergize relay R.

Relay G is provided with a pick-up circuit controlled by selector $J^1$ and passes from terminal D, over front contact 21 of relay R, wires 2 and 27, contact 7 of selector $J^1$, wires 28 and 29 and winding of relay G to terminal E. The relay G is also provided with a stick circuit which may be traced from terminal D over back contact 30 of relay K, wire 31, contact $7^a$ of selector $J^3$, wire 32, back contact 33 of relay H, wire 34, front contact 40 of relay G, wires 35 and 29, and winding of relay G to terminal E. It will be seen, therefore, that relay G can be closed only if selector $J^1$ is operated when relay R is energized. After relay G has once been closed, however, it is subsequently maintained in its energized condition as long as relay H remains open and contact $7^a$ of selector $J^3$ remains closed, provided relay K is deenergized. If relay K is energized, however, the stick circuit for relay G passes from terminal D, over front contact 21 of relay R, wires 22, 23 and 36, front contact 30 of relay K, wire 31, contact $7^a$ of selector $J^3$, wire 32, back contact 33 of relay H, wire 34, front contact 40 of relay G, wires 35 and 29, and winding of relay G to terminal E. When relay K is energized, therefore, the stick circuit for relay G includes a front contact of relay R and its stick circuit will be broken if a train enters section A—B. The control of relay H by selector $J^2$ is similar to the control of relay G by selector $J^1$ and will be understood from the drawing without tracing the stick circuits in detail. It should be pointed out, however, that relay H is provided with a stick circuit which goes direct to terminal D over back contact 30 of relay K when this relay is deenergized but that the stick circuit for relay H passes over front contact 21 of relay R when relay K is energized.

In explaining the operation of the apparatus as a whole, I will first assume that relay K is deenergized and that the section A—B is unoccupied so that relay R is energized. I will also assume that the switch 3 occupies its normal position. If, under these conditions selector $J^1$ is operated, relay G picks up, and is subsequently held closed by its stick circuit over back contact 33 of relay H, contact $7^a$ of selector $J^3$ and back contact 30 of relay K. The energization of relay G closes the circuit for signal $S^1$ and this signal thereupon indicates proceed. If a train enters section A—B under these conditions, relay R becomes deenergized, thereby opening the circuit for signal $S^1$ at front contact 8 of relay R. Relay G remains energized, however, so that when the train moves out of section A-B, the subsequent energization of relay R will restore the signal to its proceed position. Under these conditions, therefore, the operation of the signals is in accordance with what is usually known as "semi-automatic" control.

In similar manner, if relay K is deenergized and selector $J^2$ is operated, relay H picks up and is subsequently stuck up over back contact 30 of relay K. When relay H closes, the circuit is completed for signal $S^2$ and this signal indicates proceed. A train entering the section A—B will deenergize relay R and put signal $S^2$ at stop, but the signal will return to its proceed position when the train leaves the section. It should also be pointed out that if the switch 3 occupies its reverse position, the energization of relay G completes the operating circuit for signal $S^3$ and the energization of relay H completes the operating circuit for signal $S^4$, the signals operating in either case in accordance with semi-automatic control.

If either of relays G or H has been picked up to clear one of the signals S, the signal can be restored to its stop position by operating selector $J^3$. The operation of this selector opens contact $7^a$, thereby opening the stick circuit for whichever one of relays G or H happens to be energized, thereby restoring the signals to stop.

I will next assume that selector $J^4$ is operated to close the pick-up circuit for relay K. After relay K closes, it is held in its energized position by virtue of its stick circuit including front contact 21 of relay R and front contact 25 of relay K. If selector $J^1$ is now operated to pick up relay G, this relay will subsequently be held closed over a stick circuit which includes front contact 30 of relay K and front contact 21 of relay R. Assuming that switch 3 occupies its normal position, the closing of relay G completes the operating circuit for signal $S^1$ and this signal thereupon indicates proceed. The signal may be restored to stop by operating selector $J^3$ to break the stick circuit for relay G as has already been described. I will assume, however, that a train enters section A—B while relay G is still energized. The opening of front contact 8 of relay R deenergizes signal $S^1$ and this signal therefore indicates stop. The opening of front contact 21 of relay R also breaks the stick circuits for relays K and G, so that both of these relays open. When the train leaves the section A—B, therefore, signal $S^1$ remains at stop, because its circuit is now open at front contact 10 of relay G. It will be manifest, therefore, that if relay K is energized, and if one of the signal control relays G or H is subsequently energized to clear one of the signals S, the signal will be placed at stop by a train entering the section A—B and the signal will remain at stop until the corresponding selector $J^1$ or $J^2$ is again operated to close the pick-up circuit for the proper relay G or H. It should also be pointed out that the deenergization of relay R caused by the entrance of a train into section A—B deenergizes relay K and restores the semi-automatic control of the signals. The operation of the signals when relay K is energized is in accordance with what is usually known as "stick" control.

It will be plain from the foregoing that one feature of my invention is the provision of circuits for accomplishing semi-automatic control of signals from a remote point and for changing this control to stick control from the remote point by operation of a single selector.

Another feature of my invention is that after the conditions have been established for stick control of the signals the control is automatically restored to semi-automatic after the passage of a train through the section governed by the signals.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a section of railway track, a track relay for said section, a signal governing traffic through said section, two manually controlled selectors, a first relay controlling said signal, a pick-up circuit for said first relay controlled by one selector and by said track relay, a second relay controlled by the other selector, a stick circuit for said first relay including a back contact of said second relay, and a second stick circuit for said first relay including a front contact of said second relay and a front contact of said track relay.

2. In combination, a section of railway track, a track relay for said section, a signal governing traffic through said section, two manually controlled selectors, a first relay controlling said signal, a second relay controlled by one selector, a pick-up circuit for said first relay controlled by the other selector, means operating when the second relay is deenergized to hold the first relay closed independently of said track relay, and means operating when the second relay is energized to hold the first relay closed only if the track relay is energized.

3. In combination, a section of railway track, a track relay for said section, a first relay, a signal for governing traffic through said section and controlled by said first relay and by said track relay, two selectors, a second relay provided with a pick-up circuit controlled by one said selector, a stick circuit for said second relay controlled by said track relay and including a front contact of the second relay, a pick-up circuit for said first relay controlled by the other selector, a stick circuit for said first relay including a front contact of the first relay, and means effective when said second relay is energized to include a front contact of the track relay in the stick circuit for said first relay.

4. In combination, a section of railway track, a track relay for said section, a first relay, a signal for governing traffic through said section and controlled by said first relay and by said track relay, a first and second selector each comprising a normally open contact arranged to be closed for a brief interval when the selector is operated, a third selector comprising a normally closed contact arranged to be opened for a brief interval when such third selector is operated, a pick-up circuit for said second relay including the contact of said first selector, a stick circuit for said second relay including a front contact of the track relay, a pick-up circuit for said first relay including a contact of said second selector and a front contact of the track relay, a stick circuit for said first relay including the contact of said third selector and a back contact of the second relay, and a branch around said contact of the second relay including a front contact of the second relay and a front contact of the track relay.

5. In combination, a section of railway track, a signal governing traffic through said section, a first relay controlling said signal, a second relay, means for selectively energizing said relays, a manually controlled normally closed contact, means effective after the first relay has been energized and operating if the second relay is open to hold the first relay closed until said contact becomes open, and means effective after the first relay has been energized and operating if the second relay is closed to hold the first relay closed until said contact becomes open or until a train enters said section.

6. In combination with a stretch of railway track, a signal governing traffic over said stretch, a first relay controlling said signal, means controlled from a remote point for energizing said first relay, a second relay, means for selectively operating said second relay, means effective when said second relay occupies one position for holding said first relay energized provided only said stretch is unoccupied, and means effective when said second relay occupies another position for holding said first relay energized independently of traffic conditions.

7. In combination with a stretch of railway track, a signal governing traffic over said stretch, a first relay, means for clearing said signal when said first relay is energized provided said stretch is unoccupied, means controlled from a remote point for energizing said first relay, a second relay, means for selectively operating said second relay, means effective when said second relay occupies one position for holding said first relay energized provided only said stretch is unoccupied, and means effective when said second relay occupies another position for holding said first relay energized independently of traffic conditions.

8. In combination with a section of railway track, a signal governing traffic over said section, a track circuit for said section including a track relay, a control relay, means for clearing said signal when said control relay and said track relay are both energized, means controlled from a remote point for energizing said control relay, a third relay, means for selectively operating said third relay, a stick circuit for said control relay controlled by said track relay, and means controlled by said third relay for at times preventing control of said stick circuit by said track relay.

9. In combination with a section of railway track, a signal governing traffic over said section, a track circuit for said section including a track relay, a control relay, means for clearing said signal when said control relay and said track relay are both energized, means controlled from a remote point for energizing said control relay, a third relay, means for selectively operating said third relay, a stick circuit for said control relay including a front contact of said track relay, and another stick circuit for said control relay including a contact of said third relay but not a contact of said track relay.

10. In combination with a section of railway track, a signal governing traffic over said section, a track circuit for said section including a track relay, a control relay, means for clearing said signal when said control relay and said track relay are both energized, means controlled from a remote point for energizing said control relay, a stick circuit for said control relay controlled by said track relay, and means controlled from said remote point for at times preventing control of said stick circuit by said track relay.

11. In combination with a section of railway track, a signal governing traffic over said section, a track circuit for said section including a track relay, a control relay, means for clearing said signal when said control relay and said track relay are both energized, means controlled from a remote point for energizing said control relay, a stick circuit for said control relay including a front contact of said track relay, and means controlled from said remote point for at times holding said control relay energized independently of said track relay.

12. In combination with a section of railway track, a signal governing traffic over said section, a track circuit for said section including a track relay, a control relay and a third relay adjacent said section, means controlled from a remote point for momentarily selectively energizing said control relay and said third relay, a stick circuit for said third relay, a stick circuit for said control relay including a front contact of said track relay, means controlled by said third relay for at times removing said track relay from the control of said control relay, and means for clearing said signal when said control relay and said track relay are both energized.

13. In combination with a section of railway track, a signal governing traffic over said section, a track circuit for said section including a track relay, a control relay and a third relay adjacent said section, means controlled from a remote point for momentarily selectively energizing said control relay and said third relay, a stick circuit for said third relay including a front contact of said track relay, a stick circuit for said control relay including a front contact of said track relay, another stick circuit for said control relay including a contact of said third relay but not a contact of said track relay, and means for clearing said signal when said control relay and said track relay are both energized.

14. In combination with a section of railway track provided with a switch and a track relay, a signal for governing traffic over said section, a control relay adjacent said section, means controlled from a remote point for momentarily energizing said control relay, a stick circuit for said control relay controlled by said track relay, means controlled from said remote point for at times preventing control of said stick circuit by said track relay, and means controlled by said control relay, by said switch and by said track relay for clearing said signal.

15. In combination with a section of railway track, a signal governing traffic over said section, a track circuit for said section including a track relay, a control relay, adjacent said section, a code transmitter at a remote point for at times momentarily energizing said control relay, a third relay, means controlled by said code transmitter for momentarily energizing said third relay, a stick circuit for said third relay, a stick circuit for said control relay controlled by said track relay, another stick circuit for said control relay controlled by said third relay but not by said track relay, and means controlled by said control relay and by said track relay for governing said signal.

16. In combination with a section of railway track, a track circuit for said section including a track circuit, a pair of opposing signals for governing traffic in opposite directions through said section, a pair of control relays one for each said signal, means controlled from a remote point for selectively momentarily energizing said control relays, means controlled by said track relay for subsequently holding the selected control relay in its energized condition, means controlled from said remote point for removing the track relay from the control of said control relays, and means controlled by each control relay for governing the associated signal.

In testimony whereof I affix my signature.

PAUL P. STOKER.